Oct. 13, 1953     K. B. WARWICK     2,655,222
MEANS FOR LUBRICATING CHAINS
Filed March 22, 1951
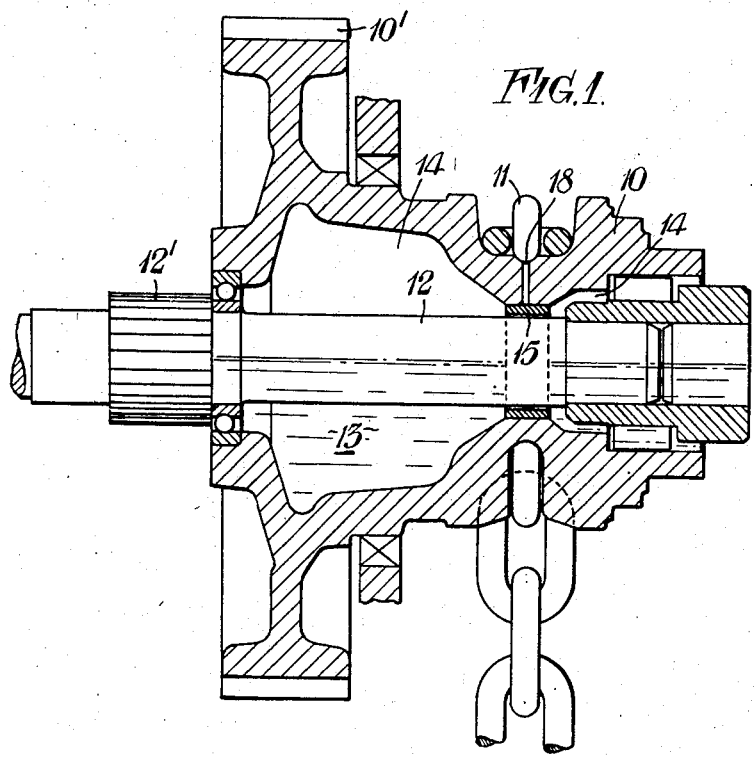
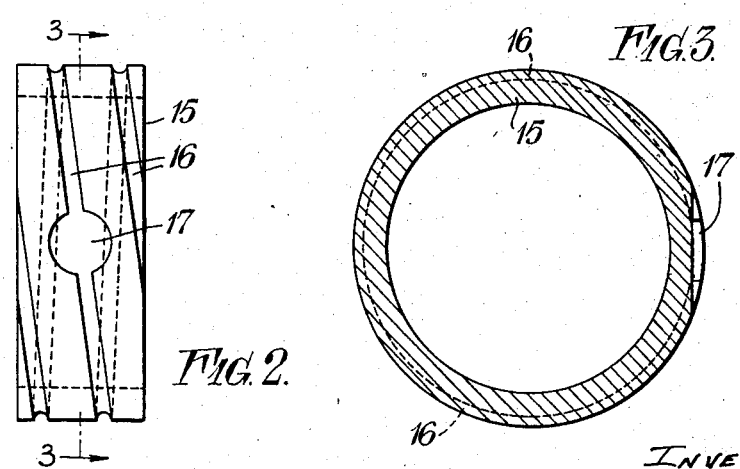
INVENTOR
KENNETH BERNARD WARWICK
By
Haseltine, Lake & Co.
AGENTS Patented Oct. 13, 1953

2,655,222

UNITED STATES PATENT OFFICE 2,655,222

MEANS FOR LUBRICATING CHAINS

Kenneth Bernard Warwick, Hitchin, England, assignor to Geo. W. King Limited, Hitchin, England, a British company Application March 22, 1951, Serial No. 216,937
In Great Britain April 21, 1950

5 Claims. (Cl. 184—15)

1

This invention relates to means for lubricating chains such as are employed in hoists and similar lifting or haulage apparatus.

According to the invention a sprocket wheel or the like, around which a chain is caused to pass, is formed with a passage in the hub or central portion thereof which is adapted to provide communication between a supply of oil and the outer surface of the sprocket or the like with which the chain is in contact, the arrangement being such that on rotation of said sprocket or the like small quantities of oil will be fed to the chain as it passes therearound, there being no passage or leakage of oil during such times as said sprocket or the like is at rest.

In order that the invention may be clearly understood and readily carried into effect the same will now be more fully described with reference to the accompanying drawings in which:

Figure 1 is a sectional view through a sprocket wheel of a hoist incorporating chain lubricating means according to the invention, Figure 2 is an elevational view of a detail drawn to a large scale, Figure 3 is a section on the line 3—3 of Figure 2.

Referring now to the drawings, reference numeral 10 denotes the sprocket of a hoist while 11 denotes a load chain disposed around said sprocket. The sprocket 10 is supported for rotation on a shaft 12 which is rotatably disposed in an oil bath indicated at 13. In the embodiment illustrated the shaft 12 is driven from a suitable prime mover e. g. an electric motor (not shown) and the drive is transmitted to the sprocket 10 through the medium of reduction gearing (not shown) interposed between the gear 12' on said shaft and the gear ring 10' on the sprocket. As will be seen from Figure 1, the oil bath 13 is provided within the core of the sprocket itself, the latter being formed with an internal chamber 14 in which the oil is maintained at a level such that the shaft 12 will be partially immersed therein.

The sprocket 10 is fitted internally at the central or hub portion thereof with a bush 15 which has an oil tight fit within said sprocket hub and is at the same time so dimensioned as to accommodate the shaft 12 with a degree of clearance. As will be seen from Figure 2, the bush 15 is formed on its outer surface with a helical groove 16 and at a point in its periphery at substantially the midpoint of its width or length, said bush is additionally formed with a recess 17 with which the portions of the groove are adapted

2 to communicate. The central or hub portion of the sprocket 10 is formed with a bore or passage 18 which is adapted to register with the recess 17 in the bush and to extend therefrom to the outer periphery of said sprocket.

The construction is such that on rotation of the sprocket oil will be picked up from the bath 13 by the groove 16 and will be transferred to the recess 17 which serves as a well or storage space. On continued rotation of said sprocket, oil will flow from the recess 17 through the passage 18 to the chain 11.

It will be apparent that there will be no passage or leakage of oil during such times as the sprocket is at rest, but during rotation of the latter oil will be supplied continuously in small quantities to the chain thereby to effect efficient lubrication of the latter.

It will be apparent that in place of the helical groove suggested above, one or more grooves of any suitable form may be provided in the outer surface of the bush provided that on rotation of the sprocket a quantity of oil will be picked up and delivered to the recess which constitutes a well or oil storage space. Further, it may be feasible in certain cases to provide two or any other suitable number of recesses at spaced points around the periphery of the bush, each being adapted to communicate with a bore or passage in the central or hub portion of the sprocket. Again, it may be feasible to dispense with the bush entirely and to mount the sprocket or the like directly on the shaft, with the sprocket then being formed with a groove or grooves of the type indicated above, each of such grooves being adapted to communicate with a well or recess formed in the shaft which well or recess is, in turn, adapted to register with a bore or passage in the hub of the sprocket. In such a case the shaft would have an oil tight fit in the hub of the sprocket and the two parts would rotate together.

Although the invention has been described with reference to its application to a particular type of sprocket employed in a hoist, it will be apparent that it may readily be employed in any case wherein hoist or haulage chains are caused to pass around sprockets or guide or driving wheels or rollers.

I claim:

1. A chain lubricating device comprising a rotatable sprocket wheel around which the chain is caused to pass and which is formed with a duct extending from the periphery and through the body thereof, a member associated with said sprocket member to rotate therewith and including a recess which is in communication with the duct in said sprocket and an open ended channel adapted to communicate with said recess, and an oil bath in which said member is adapted to rotate, the arrangement being such that on rotation of the sprocket, the channel in said member will be caused intermittently to dip into the oil in said bath and thereby to pick up small quantities of oil which will be transferred to the recess in said member and thence via the duct in the sprocket to the chain passing around the latter, there being no passage or leakage of oil during such times as the sprocket is at rest.

2. A chain lubricating device comprising, a supporting shaft, an oil bath in which said shaft is disposed, a sprocket around which the chain to be lubricated is adapted to pass, said sprocket being supported on said shaft for rotation relatively thereto, said sprocket having a duct leading from the periphery and through the body of the sprocket, and an annular bush fitted in said sprocket and adapted to accommodate the shaft with a degree of clearance, said bush being formed with an open ended channel and with a recess which communicates both with said channel and the duct in the body of said sprocket, the arrangement being such that on rotation of the sprocket the channel in said annular bush will be caused intermittently to dip into the oil in the bath and thereby to pick up small quantities of oil which will be transferred to the recess in said bush and thence via the duct in the sprocket to the chain passing around the latter, there being no passage or leakage of oil during such times as the sprocket is at rest.

3. A chain lubricating device comprising, a supporting shaft, an oil bath in which said shaft is disposed, a sprocket around which the chain to be lubricated is adapted to pass, said sprocket being supported on the shaft for rotation relatively thereto, said sprocket having a duct leading from the periphery and through the body of the sprocket, and an annular bush fitted in said sprocket and adapted to accommodate the shaft with a degree of clearance, said bush being formed with an open ended channel extending around the periphery thereof and with a recess which communicates both with said channel and the duct in the body of the sprocket, the arrangement being such that on rotation of the sprocket, the channel in said annular bush will be caused intermittently to dip into the oil in the bath and thereby to pick up small quantities of oil which will be transferred to the recess in said bush and thence via the duct in the sprocket to the chain passing around the latter, there being no passage or leakage of oil during such times as the sprocket is at rest.

4. A chain lubricating device as claimed in claim 3, wherein said channel extends around the annular bush in a helical path.

5. A chain lubricating device comprising a supporting shaft, a sprocket around which the chain to be lubricated is adapted to pass and which is supported on the shaft for rotation relatively thereto, said sprocket incorporating a duct leading from the periphery and through the body thereof and being formed with a hollow central boss adapted to constitute an oil bath in which said supporting shaft is rotatably disposed, and an annular bush fitted in said sprocket and adapted to accommodate said shaft with a degree of clearance, said bush being formed with an open ended channel extending around the periphery thereof in a helical path and with a recess which communicates both with said channel and the duct in the body of said sprocket, the arrangement being such that on rotation of the sprocket, the channel in said annular bush will be caused intermittently to dip into the oil in the bath and thereby to pick up small quantities of oil which will be transferred to the recess in said bush and thence via the duct in the sprocket to the chain passing around the latter, there being no passage or leakage of oil during such times as the sprocket is at rest.

KENNETH BERNARD WARWICK.

References Cited in the file of this patent

UNITED STATES PATENTS

| Number | Name | Date |
|---|---|---|
| 1,186,434 | Pierce | June 6, 1916 |
| 1,757,539 | Minor | May 6, 1930 |
| 1,794,725 | Minor | Mar. 3, 1931 |
| 2,471,036 | Jenkins | May 24, 1949 |